(No Model.)
R. G. FREUND.
SIFTER AND STRAINER.
No. 360,579. Patented Apr. 5, 1887.
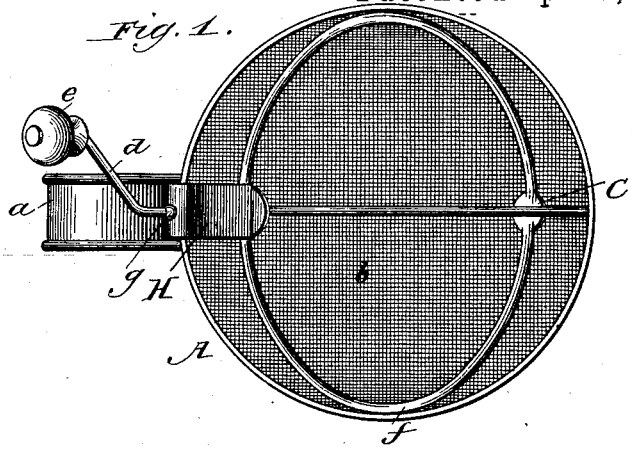
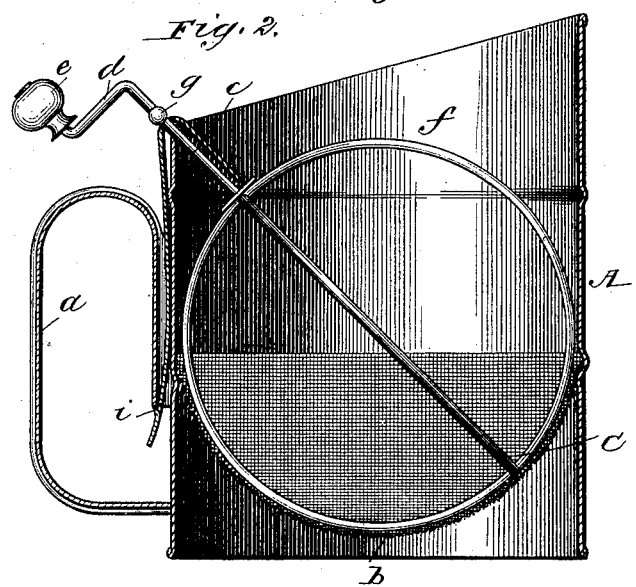
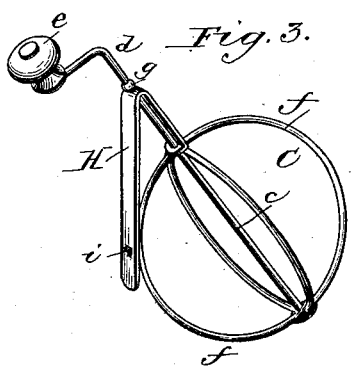
Witnesses.
W. Rossiter
Otto Luebkert.
Inventor,
Robert George Freund
By, Wm H Lotz
Atty.

UNITED STATES PATENT OFFICE.

ROBERT G. FREUND, OF CHICAGO, ILLINOIS.

SIFTER AND STRAINER.

SPECIFICATION forming part of Letters Patent No. 360,579, dated April 5, 1887.

Application filed July 23, 1886. Serial No. 208,888. (No model.)

*To all whom it may concern:*

Be it known that I, ROBERT GEORGE FREUND, a citizen of the United States of America, residing at Chicago, in the county of Cook and State of Illinois, have invented certain new and useful Improvements in Sifters and Strainers, of which the following is a specification, reference being had therein to the accompanying drawings.
This invention has for its object to provide for household use a sifter and strainer in the shape of a scoop that has attached a removable rotary agitator, stirrer, or scraper, so as to be adapted for sifting flour or for straining soup or fruit, and to afford its being easily cleaned.

My invention consists in the construction and combination of parts hereinafter described, and pointed out in the claim.
In the accompanying drawings, Figure 1 represents a plan view, and Fig. 2 a longitudinal vertical section, of my sifter and strainer complete; and Fig. 3 is a perspective view of the agitator or scraper detached.
Corresponding letters in the several figures of the drawings designate like parts.

A denotes the cylindrical scoop having handle a, and also a semispherical bottom, b, made of wire-cloth or other perforated material.
The scraper or agitator C consists of a shaft or axle, c, bent at its upper end to form a crank, d, with a turn-knob, e, and having secured radially upon its lower portion semicircularly-bent wire arms f, the curvature of which corresponds with that of semispherical bottom b. Just below the crank d the axle c is provided with a collar, g, and that portion of axle c between collar g and arms f is pivoted in eyelets formed in the upper shank of the bent plate H, the other or longer shank of which is removably inserted into a vertical opening provided between the body of the scoop A and its handle a. A protuberance, i, is swaged or otherwise formed upon the lower end of the lower shank of plate H, which, owing to the spring force of such shank, will engage the lower end of the confining-walls of the slot into which the shank is inserted and lock it therein. To remove it, the lower end of such shank must be pressed inward. In this manner, as will be seen, the axle c is placed over the rear upper edge of the scoop in an oblique direction, bringing the arms of the scraper C centrally in contact with the perforated bottom b, and locating its crank d above handle a, where, for scooping, it is entirely clear of the mouth of the scoop, and where, while holding the handle with one hand, it is in convenient position for the other hand to turn the scraper or agitator.

What I claim is—

The herein-described sifter and strainer, comprising the scoop A, provided with handle a, with vertical slot between its outside and said handle, and with a semispherical perforated bottom, b, the obliquely-arranged rotary scraper or agitator C, consisting of axle c, having crank d and semicircular arms f, and the detachable bent frame adapted to fit said slot, and provided with the protuberance i, substantially as described.

In testimony whereof I affix my signature in presence of two witnesses.

ROBERT GEO. FREUND.

Witnesses:
OTTO LUEBKERT,
HARRIS W. HUEHL.